US012789442B2

(12) United States Patent
Sakabe et al.

(10) Patent No.: US 12,789,442 B2
(45) Date of Patent: Nov. 10, 2026

(54) BLOW MOLDING MOLD UNIT AND RESIN CONTAINER MANUFACTURING DEVICE

(71) Applicant: NISSEI ASB MACHINE CO., LTD., Komoro (JP)

(72) Inventors: Yuji Sakabe, Komoro (JP); Kazuhiro Dobashi, Thane (IN); Ryo Kawamura, Thane (IN)

(73) Assignee: NISSEI ASB MACHINE CO., LTD., Komoro (JP)

( * ) Notice: Subject to any disclaimer, the term of this patent is extended or adjusted under 35 U.S.C. 154(b) by 96 days.

(21) Appl. No.: 18/849,627

(22) PCT Filed: Mar. 23, 2023

(86) PCT No.: PCT/JP2023/011504

§ 371 (c)(1),
(2) Date: Sep. 23, 2024

(87) PCT Pub. No.: WO2023/182427

PCT Pub. Date: Sep. 28, 2023

(65) Prior Publication Data

US 2025/0205960 A1 Jun. 26, 2025

(30) Foreign Application Priority Data

Mar. 25, 2022 (JP) ................................. 2022-050787

(51) Int. Cl.
*B29C 49/48* (2006.01)
*B29L 31/00* (2006.01)

(52) U.S. Cl.
CPC *B29C 49/48185* (2022.05); *B29C 2049/4864* (2013.01); *B29L 2031/712* (2013.01)

(58) Field of Classification Search
None
See application file for complete search history.

(56) References Cited

U.S. PATENT DOCUMENTS

2011/0052744 A1 3/2011 Meinzinger et al.
2011/0057342 A1 3/2011 Meinzinger et al.
(Continued)

FOREIGN PATENT DOCUMENTS

CN 109130143 A 1/2019
CN 209869367 U 12/2019
(Continued)

OTHER PUBLICATIONS

International Search Report dated May 16, 2023 issued in corresponding International application No. PCT/JP2023/011504; English translation included (5 pages).
(Continued)

*Primary Examiner* — Mohammad M Ameen
(74) *Attorney, Agent, or Firm* — Rankin, Hill & Clark LLP

(57) ABSTRACT

A blow molding mold unit includes a pair of blow cavity split molds for forming a blow cavity, the blow cavity defining a shape of a side surface of a resin container, a bottom mold, and a jig configured to integrally support the pair of blow cavity split molds and the bottom mold. In a case where a direction extending from a shoulder portion or a body portion to a bottom portion of the resin container defined by the blow cavity is defined as a first direction, a direction in which the pair of blow cavity split molds are opened is defined as a second direction, and a direction orthogonal to the first direction and the second direction is defined as a third direction, the jig is provided at an end of the blow molding mold unit in the third direction.

2 Claims, 10 Drawing Sheets

(56) References Cited

U.S. PATENT DOCUMENTS

| | | | |
|---|---|---|---|
| 2014/0291877 A1 | 10/2014 | Takahashi | |
| 2015/0290865 A1 | 10/2015 | Horigome et al. | |
| 2015/0343697 A1* | 12/2015 | Takehana | B29C 49/5603 425/538 |
| 2016/0167282 A1 | 6/2016 | Takehana et al. | |
| 2017/0326780 A1 | 11/2017 | Protais et al. | |
| 2018/0370111 A1 | 12/2018 | Takahashi | |
| 2019/0022914 A1 | 1/2019 | Horigome et al. | |
| 2019/0111607 A1 | 4/2019 | Derrien | |
| 2019/0291332 A1 | 9/2019 | Baumgarte et al. | |
| 2020/0406526 A1 | 12/2020 | Horigome et al. | |
| 2022/0410463 A1 | 12/2022 | Horigome et al. | |

FOREIGN PATENT DOCUMENTS

| | | | |
|---|---|---|---|
| EP | 2 977 175 | A1 * | 1/2016 |
| JP | 2013-86500 | A | 5/2013 |
| JP | 2013-107391 | A | 6/2013 |
| JP | 2019-507695 | A | 3/2019 |
| JP | 2022 032 349 | A * | 2/2022 |
| JP | 2022-32349 | A | 2/2022 |
| WO | 2014/027616 | A1 | 2/2014 |

OTHER PUBLICATIONS

Written Opinion of the International Searching Authority dated May 16, 2023 issued in corresponding International application No. PCT/JP2023/011504; English translation included (8 pages).

Taiwanese Office Action dated Nov. 1, 2023 issued in corresponding Taiwanese application No. 112111214; English translation included (21 pages).

* cited by examiner

BLOW MOLDING MOLD UNIT AND RESIN CONTAINER MANUFACTURING DEVICE

TECHNICAL FIELD

The present disclosure relates to a blow molding mold unit and a resin container manufacturing device.

BACKGROUND ART

PTL 1 discloses a blow mold unit that includes a blow mold having first and second blow cavity split molds and a plurality of raised bottom molds. PTL 2 discloses a blow molding machine that includes a support member for supporting mold components that are carried into or out of the blow molding machine, and a moving mechanism for moving the support member between a protruding position and an accommodating position.

CITATION LIST

Patent Literature

PTL 1: JP2013-086500A
PTL 2: JP2013-107391A

SUMMARY OF INVENTION

Technical Problem

A manufacturing device for manufacturing a resin container by injection blow molding uses a large number of mold components. When changing a product to be molded in the manufacturing device, a large number of mold components are used, and therefore, the mold exchange work takes time. Further, since the high-mix, small-lot production requires more frequent mold exchange, the production efficiency may decrease. Further, many manufacturing devices for the high-mix, small-lot production are relatively small, and the structures in larger devices may not be suitable.

The present disclosure aims to provide a blow molding mold unit and a resin container manufacturing device capable of shortening the time required for mold exchange.

Solution to Problem

A blow molding mold unit according to one aspect of the present disclosure is a blow molding mold unit that includes:

- a pair of blow cavity split molds for forming a blow cavity, the blow cavity defining a shape of a side surface of a resin container in a state where the molds are closed;
- a bottom mold defining a shape of a bottom surface of the resin container; and
- a jig configured to integrally support the pair of blow cavity split molds and the bottom mold,
- in which in a case where a direction extending from a neck portion to a bottom portion of the resin container defined by the blow cavity is defined as a first direction, a direction in which the pair of blow cavity split molds are opened is defined as a second direction, and a direction orthogonal to the first direction and the second direction is defined as a third direction, the jig is provided at an end of the blow molding mold unit in the third direction.

A resin container manufacturing device according to one aspect of the present disclosure is a resin container manufacturing device including a blow molding part for blow molding a resin container from a bottomed resin preform, the blow molding part including:

- a pair of blow cavity split molds for forming a blow cavity, the blow cavity defining a shape of a side surface of the resin container in a state where the molds are closed;
- a bottom mold defining a shape of a bottom surface of the resin container;
- a bottom mold fixing plate to which the bottom mold is fixed;
- a bottom mold lifting plate connected to the bottom mold fixing plate; and
- a lifting rod fixed to the bottom mold lifting plate,
- in which the bottom mold fixing plate is configured to be attached to or detached from the bottom mold lifting plate in a state where the bottom mold is fixed to the bottom mold fixing plate.

Advantageous Effects of Invention

According to the present disclosure, it is possible to provide a blow molding mold unit and a resin container manufacturing device capable of shortening the time required for mold exchange.

DESCRIPTION OF EMBODIMENTS

Figure 1:
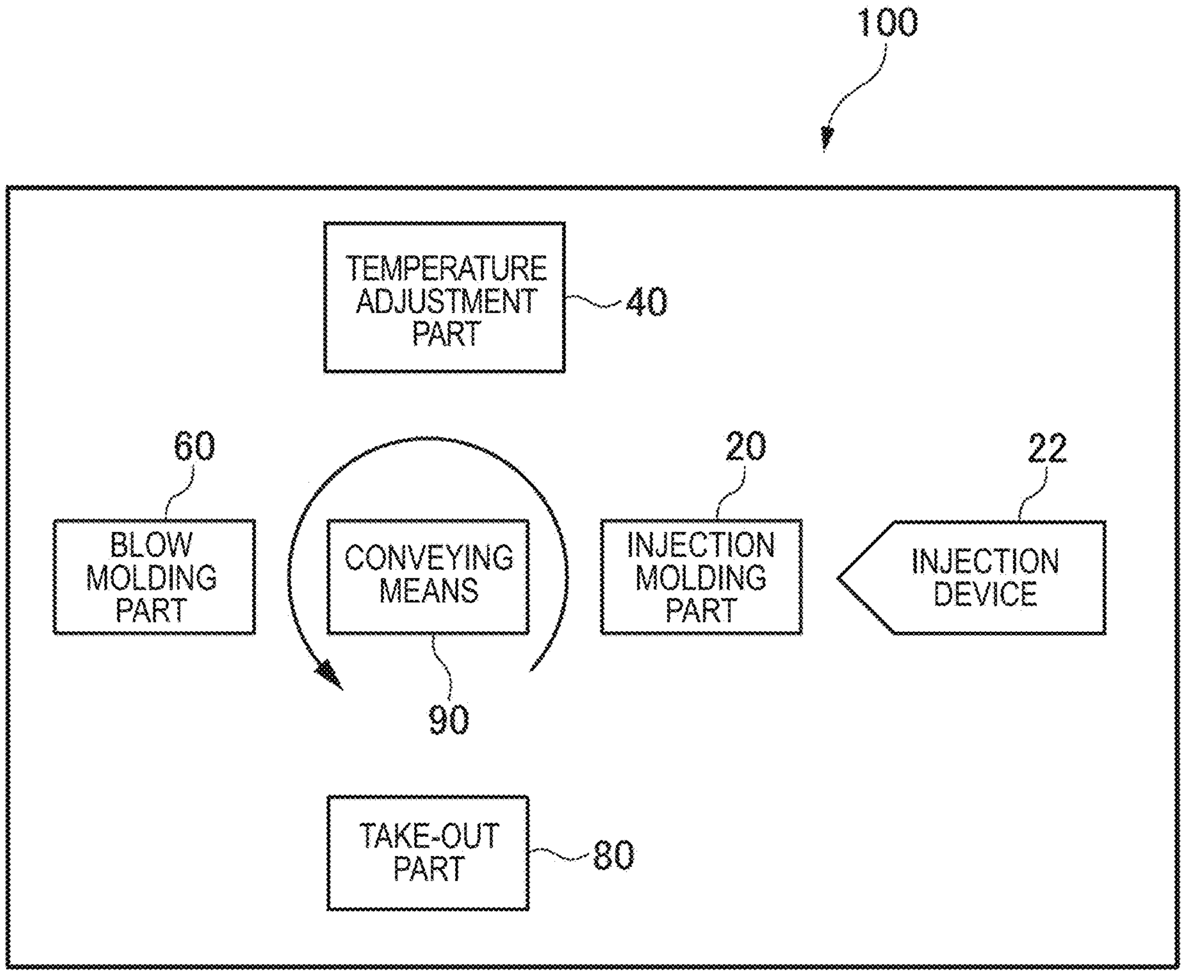
FIG. 1 is a view showing functional blocks of a resin container manufacturing device.

Hereinafter, embodiments of the present disclosure will be described with reference to the drawings. It should be noted that the dimensions of each component shown in the drawings may differ from the actual dimensions of each component for the sake of convenience of explanation.

First, a resin container manufacturing device 100 according to an embodiment will be described with reference to FIG. 1. FIG. 1 is a view showing functional blocks of the manufacturing device 100.

As shown in FIG. 1, the manufacturing device 100 includes an injection molding part 20 for manufacturing a bottomed resin preform, a temperature adjustment part 40 for adjusting the temperature of the manufactured preform, a blow molding part 60 for blow molding a resin container from the preform, and a take-out part 80 for taking out the manufactured container. An injection device 22 for supplying resin material as raw material is connected to the injection molding part 20. Further, the manufacturing device 100 includes a conveyance means 90 for conveying the preform or container across the injection molding part 20, the temperature adjustment part 40, the blow molding part 60 and the take-out part 80.

The injection molding part 20, the temperature adjustment part 40, the blow molding part 60, and the take-out part 80 are provided at positions rotated by a predetermined angle (90 degrees in the present embodiment) around the conveyance means 90 (or with respect to the center of rotation of the conveyance means 90). The conveyance means 90 includes a rotating plate and the like. The conveyance means 90 is configured so that the preform and container with their lip portions (neck portions) supported by a lip mold attached to the rotating plate are conveyed to each part with the rotation of the rotating plate.

The injection molding part 20 includes an injection molding mold including at least an injection core mold and an injection cavity mold. The injection molding part 20 is configured to form a preform, by pouring molten resin material (for example, polyester-based resins such as PET (polyethylene terephthalate) or polyolefin-based resins such as PP (polypropylene)) (by filling with molten resin) from the injection device 22 into an injection cavity (molding space for the preform) formed by clamping the injection core mold, the injection cavity mold, and the lip mold.

The temperature adjustment part 40 includes at least a temperature adjustment core component (core mold for temperature adjustment) and a temperature adjustment cavity component (cavity mold for temperature adjustment). The temperature adjustment part 40 is configured to adjust the temperature of the preform to a temperature suitable for blow molding, by accommodating the preform molded in the injection molding part 20 into the temperature adjustment cavity component and by inserting the temperature adjustment core component into the inside of the preform. The temperature adjustment cavity component and the temperature adjustment core component may be ones (contact type temperature adjustment molds) in which temperature adjustment medium such as water flows therein, or ones (non-contact type temperature adjustment molds) that adjusts temperature by an infrared heater, and the like. Further, the temperature adjustment cavity component and the temperature adjustment core component may be configured in multiple stages with the temperature being different for each stage. Further, the temperature adjustment core component may be one in which the preform is cooled by feeding cooling air into the inside of the preform.

The blow molding part 60 includes at least blow cavity split molds and a bottom mold. The blow molding part 60 may include a stretch rod, a blow core component (a core mold for supplying and discharging blow air), and the like. The blow molding part 60 is configured to mold a container, by introducing air from the blow core component to expand the preform into the shape of the blow cavity while stretching the preform whose temperature is adjusted in the temperature adjustment part 40, for example, by the stretch rod.

The take-out part 80 is configured to remove, from the lip mold of the conveyance means 90, a lip portion of the container molded in the blow molding part 60 and take out the container from the manufacturing device 100. The take-out part 80 includes at least an ejector rod component (a rod-shaped mold for taking out a container) for removing the container from the lip mold.

In the manufacturing device 100, the container is manufactured through an injection molding process in which a preform is injection molded in the injection molding part 20, a temperature adjustment process in which the temperature of the preform is adjusted to a temperature suitable for blow molding in the temperature adjustment part 40, and a blow molding process in which a container is blow molded from the temperature-adjusted preform in the blow molding part 60. Finally, in the take-out part 80, a take-out process is conducted by removing the lip portion of the container from the lip mold of the conveyance means 90, and the container is taken out from the manufacturing device 100.

Subsequently, the aspects of the various components (various molds), devices, and component exchange (mold exchange) used in the manufacturing device 100 will be described with reference to the drawings.

Blow Molding Part 60 and Various Components Used in the Blow Molding Part 60

Figure 2:
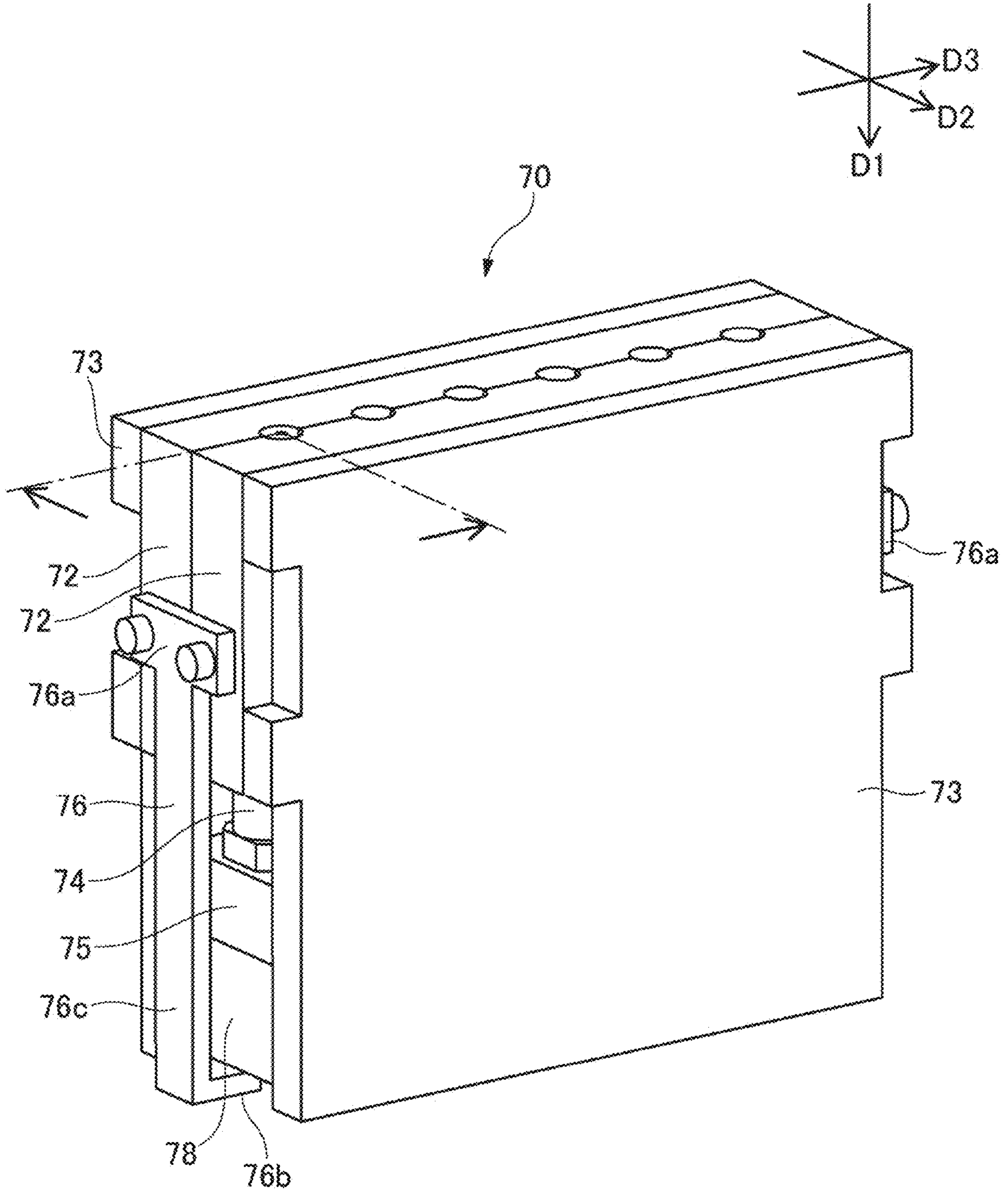
FIG. 2 is a perspective view of a blow molding mold unit.
Figure 3:
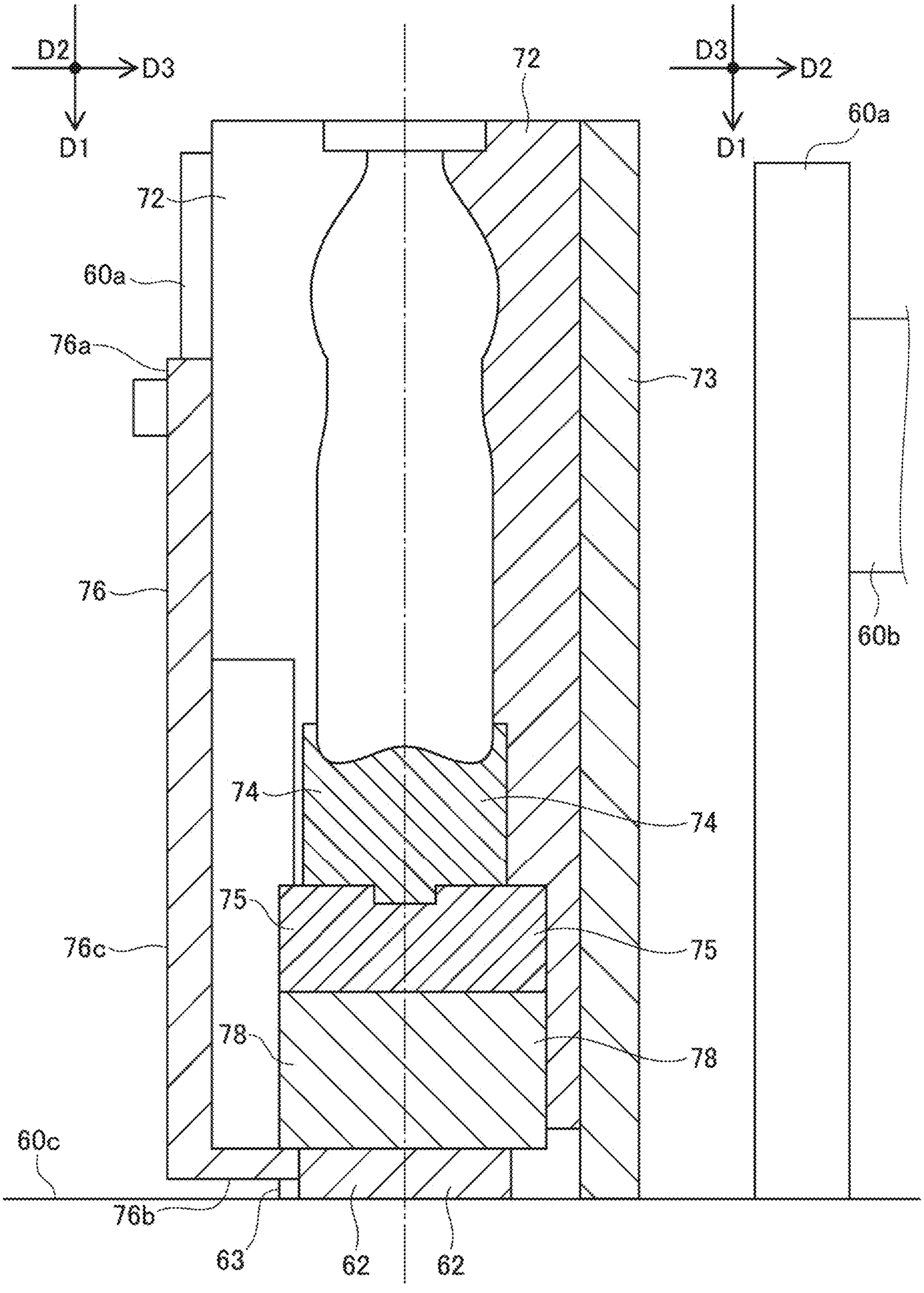
FIG. 3 is a partial cross-sectional view of the blow molding mold unit.
Figure 4:
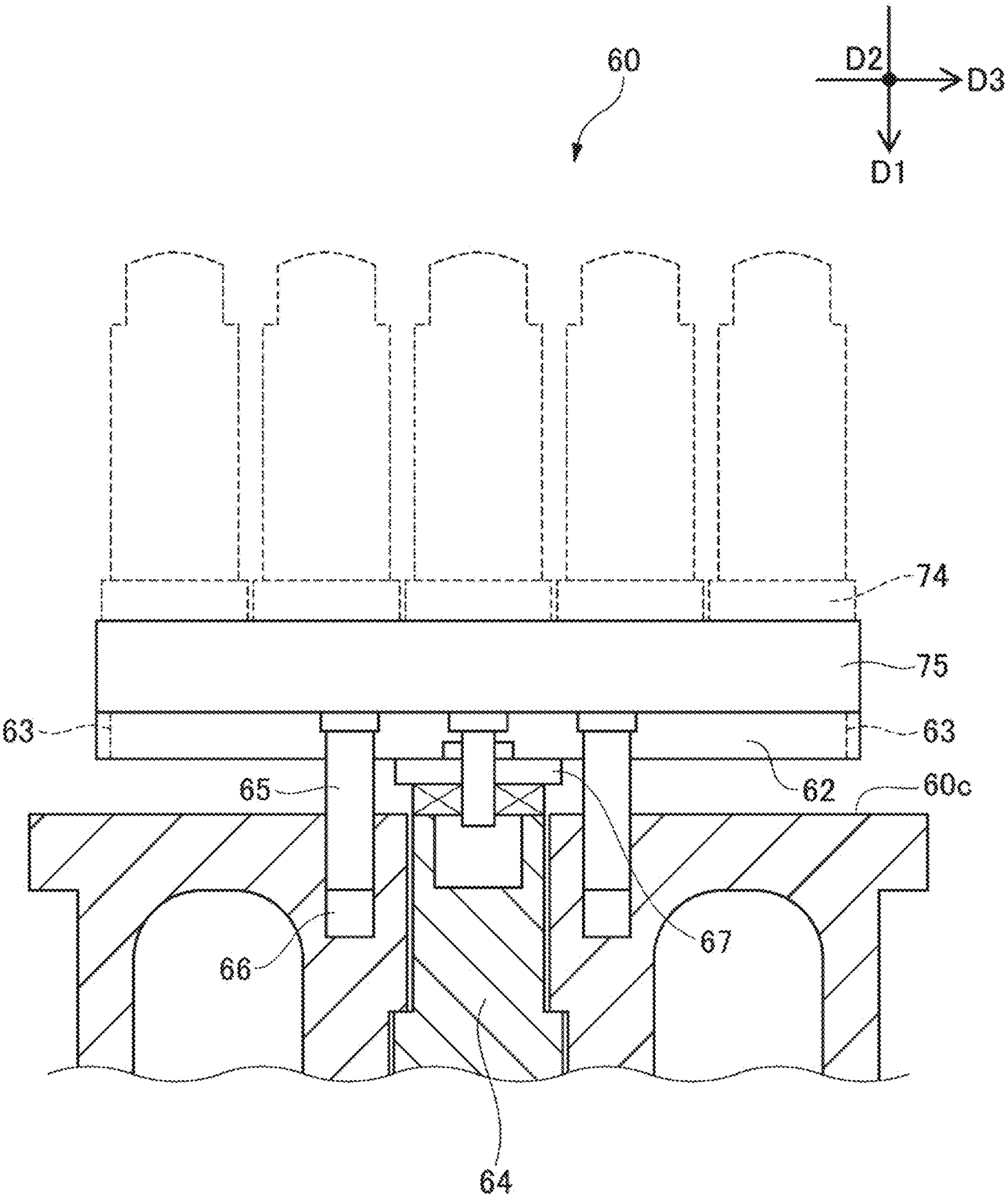
FIG. 4 is a view showing an aspect of a blow molding part.

First, the blow molding part 60 and various components used in the blow molding part 60 will be described with reference to FIGS. 2 to 4. FIG. 2 is a perspective view of a blow molding mold unit (blow mold unit) 70. FIG. 3 is a partial cross-sectional view of the blow molding mold unit 70. In FIG. 3, the left half is a view of the blow molding mold unit 70 as seen from a second direction D2 to be described later, and the right half is a view of the blow molding mold unit 70 as seen from a third direction D3 to be described later. FIG. 4 is a view showing an aspect of the blow molding part 60. FIG. 2 and FIG. 3 show the blow molding mold unit 70 in a state before it is attached to the manufacturing device 100. FIG. 4 shows a bottom mold 74 to be described later included in the blow molding mold unit 70 in a state of being attached to the manufacturing device 100.

The blow molding mold unit 70 shown in FIG. 2 and FIG. 3 forms at least one blow cavity (a molding space for a container) in a state where the mold is closed. The blow molding mold unit 70 includes, at least, a pair of blow cavity split molds 72 that define the shape of a side surface of at least one resin container, at least one bottom mold 74 that defines the shape of a bottom surface of the container, and at least one (two in the present embodiment) jig (component for mold connection) 76 that integrally supports (fixes) the pair of blow cavity split molds 72 and the bottom mold 74.

The jig 76 is removed from the blow molding mold unit 70 after the blow molding mold unit 70 is carried into the blow molding part 60. That is, during blow molding, components of the blow molding mold unit 70 except for the jig 76 are used. Meanwhile, the term “integrally support” used in explaining the jig 76 is not limited to the case where the jig 76 directly contacts and integrally supports the blow cavity split molds 72 or the bottom mold 74, but also includes the case where the jig 76 integrally supports the blow cavity split molds 72 or the bottom mold 74 indirectly by including any member (for example, a bottom mold fixing plate 75 or a spacer component 78 to be described later) therebetween.

Here, a direction extending from a shoulder portion (or body portion) to a bottom portion of a container defined by the blow cavity is defined as a first direction D1, a mold opening direction of the pair of blow cavity split molds 72 is defined as the second direction D2, and a direction (a direction in which a dividing line (a parting line) formed on the upper surfaces of the pair of blow cavity split molds 72 abutting each other extends, or, a direction in which the plurality of blow cavities extend) orthogonal to the first direction D1 and the second direction D2 is defined as the third direction D3. The jig 76 is provided at an end of the blow molding mold unit 70 in the third direction D3. In detail, the jig 76 is provided at both ends (both sides) of the blow molding mold unit 70 in the third direction D3, integrating at least one pair of blow cavity split molds 72 and the bottom mold 74 at both ends in the third direction D3.

The blow molding mold unit 70 further includes a pair of split mold fixing plates 73 to which each of the pair of blow cavity split molds 72 is independently fixed. The split mold fixing plates 73 are configured to be connected to mold clamping plates 60*a* of mold clamping/mold opening devices 60*b* provided in the blow molding part 60 of the manufacturing device 100. Further, the blow molding mold unit 70 may further include pressure receiving members at positions on both sides of the split mold fixing plates 73 to which the blow cavity split molds 72 are fixed.

The blow molding mold unit 70 further includes the bottom mold fixing plate 75 to which at least one bottom mold 74 is fixed. The bottom mold fixing plate 75 is configured to be connected to a bottom mold lifting plate 62 provided in the blow molding part 60 of the manufacturing device 100. In detail, the bottom mold fixing plate 75 is configured to be attached to the bottom mold lifting plate 62 and to be removed from the bottom mold lifting plate 62 in a state where the bottom mold 74 is fixed to the bottom mold fixing plate 75. The manner of connecting the bottom mold fixing plate 75 and the bottom mold lifting plate 62 is not particularly limited, and they may be fastened by a fastening member such as a bolt, for example.

The jig 76 includes a fastening portion 76*a* fastened to the pair of blow cavity split molds 72 (or pressure receiving members), a bottom mold support portion 76*b* that supports the bottom mold 74 from the bottom side in the first direction D1, and an arm portion 76*c* provided between the fastening portion 76*a* and the bottom mold support portion 76*b*. The fastening portion 76*a* includes a long plate-shaped split mold fixing portion extending across the parting line on the side surfaces of the pair of blow cavity split molds 72, and two fastening members provided on the split mold fixing portion to fix two blow cavity split molds 72 to the split mold fixing portion. The fastening members are composed of bolts or the like, for example. In the embodiment, the fastening portion 76*a* of the jig 76 is fastened to the pair of blow cavity split molds 72 with their parting surfaces abutting each other (in the mold-closed state), so that the pair of blow cavity split molds 72 are fixed in a state where they cannot be opened. The arm portion 76*c* extends from the fastening portion 76*a* toward the bottom side in the first direction D1. The jig 76 is detachable from the pair of blow cavity split molds 72. Meanwhile, the fastening portion 76*a* may be fastened directly or indirectly to the pair of blow cavity split molds 72. The expression "the fastening portion 76*a* is indirectly fastened to the pair of blow cavity split molds 72" includes, for example, the case where the fastening portion 76*a* is fastened to the pressure receiving members disposed on the side surfaces of the pair of blow cavity split molds 72.

The bottom mold support portion 76*b* extends from the arm portion 76*c* toward the inside of the blow molding mold unit 70. In detail, the bottom mold support portion 76*b* is configured to support the bottom mold 74 and the bottom mold fixing plate 75 from the bottom side (lower surface side) in the first direction D1. In addition, in the present embodiment, in order to prevent the bottom mold 74 from moving when the blow molding mold unit 70 is conveyed, the spacer component 78 is further disposed between the bottom mold fixing plate 75 and the bottom mold support portion 76*b*. Meanwhile, the spacer component 78 is an optional component that may or may not be employed, but it is preferable to employ it appropriately according to thy size of the mold.

In the present embodiment, the bottom mold 74, the bottom mold fixing plate 75 and the spacer component 78 are placed on the bottom mold support portion 76*b* of the jig 76 fixed to the blow cavity split molds 72. The bottom mold 74, the bottom mold fixing plate 75 and the spacer component 78 are supported and integrated with the pair of blow cavity split molds 72 by the bottom mold support portions 76*b* of the jigs 76 provided on both ends of the blow molding mold unit 70 in the third direction D3.

Meanwhile, fastened portions (for example, holes for fastening bolts or fixation pins, or the like) are formed at positions corresponding to the fastening portions 76*a* of the jigs 76 on both side surfaces of the blow cavity split molds 72 in the third direction D3. Further, supported portions (for example, recessed portions with which the upper surfaces on the free end side of the bottom mold support portions 76*b* engage, or the like) are provided at positions of the bottom mold fixing plates 75 or the spacer components 78, the positions corresponding to the bottom mold support portions 76*b* of the jigs 76.

The bottom mold lifting plate 62 provided in the blow molding part 60 of the manufacturing device 100 shown in FIG. 3 and FIG. 4 is a component that is fixed to a lifting rod 64 of a lifting device (not shown) and is configured to move up and down. The lifting device, the lifting rod 64 and the bottom mold lifting plate 62 are components (mechanical components) provided in the manufacturing device 100.

A recessed portion 63 is formed at an end of the bottom mold lifting plate 62 in the third direction D3. The recessed portion 63 is formed to be accommodate the free end of the bottom mold support portion 76*b* of the jig 76 in a case where the blow molding mold unit 70 is carried into the blow molding part 60 of the manufacturing device 100. In detail, the recessed portion 63 is formed so that, in a case where the blow molding mold unit 70 is carried into the blow molding part 60 of the manufacturing device 100, the bottom mold support portion 76*b* of the jig 76 can be accommodated into the recessed portion 63, and the bottom mold fixing plate 75 or the spacer component 78 can be disposed directly on the bottom mold lifting plate 62. Further, the bottom mold lifting plate 62 includes a plurality guide rods 65 on a lower side of the bottom mold lifting plate 62. The plurality guide rods 65 are guide up and down by guided members (guide holes) 66 of the manufacturing device 100. Further, the bottom mold lifting plate 62 is connected to the lifting rod 64 via a connecting mechanism 67 below a central portion of the bottom mold lifting plate 62.

Here, a method for exchanging a mold component of the blow molding part 60 using the blow molding mold unit 70 will be described. The pair of mold clamping plates 60*a* of the mold clamping/mold opening device 60*b* of the blow molding part 60 are brought into the mold-opened state, and the blow molding mold unit 70 is carried into the blow molding part 60 from which the mold component has been removed. The bottom mold support portion 76*b* of the jig 76 is accommodated into the recessed portion 63 of the bottom mold lifting plate 62 of the blow molding part 60, and the spacer component 78 or the bottom mold fixing plate 75 is placed on the bottom mold lifting plate 62 (FIG. 3). Subsequently, the pair of mold clamping plates 60*a* are brought into the mold-closed state, and the split mold fixing plate 73 of the blow molding mold unit 70 and the mold clamping plate 60*a* are brought into contact with each other. Subsequently, the fastening portion 76*a* of the jig 76 is released, and the jig 76 is removed from the blow molding mold unit 70. Subsequently, the mold clamping plate 60*a* is connected to the split mold fixing plate 73. Subsequently, the bottom mold fixing plate 75 or the spacer component 78 fixed to the bottom mold fixing plate 75 is connected to the bottom mold lifting plate 62 of the blow molding part 60 (FIG. 4). In a case where the spacer component 78 is not fixed to the bottom mold fixing plate 75, the spacer component 78 is removed before connecting with the bottom mold lifting plate 62, and then, the bottom mold fixing plate 75 is connected to the bottom mold lifting plate 62. In this way, the attachment of the blow cavity split molds 72 and the bottom mold 74 to the blow molding part 60 are completed. Meanwhile, when removing the blow molding mold unit 70 from the blow molding part 60, the above procedure is conducted in reverse. Further, in a case where the blow molding mold unit 70 is attached or removed, it is preferable to move the bottom mold lifting plate 62 from the lower position (standby position) to the upper position (mold-closed position or bottom mold connecting position).

Operation and Effect

According to the blow molding mold unit 70 including the jig 76 that integrally connects the pair of blow cavity split molds 72 and the bottom mold 74, the pair of blow cavity split molds 72 and the bottom mold 74 used for the blow molding can be simultaneously carried into and out of the blow molding part 60 of the manufacturing device 100. In this way, compared to exchanging the pair of blow cavity split molds 72 and the bottom mold 74 separately, the time required for carrying in and out (the time required for mold exchange) can be reduced. Further, since the jig 76 is provided at an end of the blow molding mold unit 70 in the third direction D3, the jig is less likely to come into contact with other components when the blow molding mold unit 70 is carried in and out of the blow molding part 60, making it easier to exchange the mold.

Further, in the configuration of the conventional manufacturing device 100, the bottom mold lifting plate 62 does not exist, and the bottom mold fixing plate is directly connected to the lifting rod 64. When connecting the bottom mold fixing plate to the lifting rod 64, the bottom mold 74 located directly above the lifting rod 64 had to be removed from the bottom mold fixing plate, a bolt had to be inserted from above into a through hole provided in the center of the bottom mold fixing plate to connect the bottom mold fixing plate to the upper surface of the lifting rod 64, and then, the bottom mold 74 removed had to be fixed again to the bottom mold fixing plate. In the present embodiment, the conventional bottom mold fixing plate is divided into two parts, upper and lower. The lower part is the bottom mold lifting plate 62 that is a mechanical component constantly connected to the lifting rod 64, and the upper part is the bottom mold fixing plate 75 that is configured to be easily connectable to the bottom mold lifting plate 62. In this way, the workability of exchanging the mold in the blow molding part 60 has been dramatically improved.

Further, the jig 76 has the fastening portion 76*a* fastened to the pair of blow cavity split molds 72, the bottom mold support portion 76*b* supporting the bottom mold 74 from the bottom side in the first direction D1, and the arm portion 76*c* provided between the fastening portion 76*a* and the bottom mold support portion 76*b*. Further, in the jig 76, the bottom mold support portion 76*b* extends from the arm portion 76*c* toward the inside of the blow molding mold unit 70. According to the blow molding mold unit 70 having the jig 76, the jig 76 can be easily removed by releasing the fastening portion 76*a* after the blow molding mold unit 70 is carried into the blow molding part 60 of the manufacturing device 100. In this way, the time required to install the blow cavity split molds 72 and the bottom mold 74 and operate the manufacturing device 100 can be reduced. Further, the direction in which the jig 76 is attached to and detached from the blow molding mold unit 70 is the same as the direction in which the blow molding mold unit 70 is carried into or out of the blow molding part 60. Furthermore, since the work of attaching and detaching the jig 76 with respect to the blow molding mold unit 70 can be performed in an empty space above a machine base 60*c* (an upper surface of a lower base 100*a* in the blow molding part 60 to be described later), the exchange of the mold becomes easy and the work time can be reduced.

Further, since the blow molding mold unit 70 includes the bottom mold fixing plate 75 configured to be connectable to the bottom mold lifting plate 62 provided in the manufacturing device 100, the bottom mold 74 can be easily attached to the manufacturing device. In this way, the time required for exchanging the bottom mold 74 can be further reduced.

Further, since the bottom mold support portion 76*b* is accommodated in the recessed portion 63 of the bottom mold lifting plate 62 when the bottom mold 74 and the bottom mold fixing plate 75 are placed on the bottom mold lifting plate 62, the bottom mold 74 and the bottom mold fixing plate 75 can be placed on the bottom mold lifting plate 62 so that the bottom mold support portion 76*b* is not sandwiched between the bottom mold lifting plate 62 and other components such as the bottom mold fixing plate 75. In this way, when removing the jig 76 from the blow molding mold unit 70, the bottom mold support portion 76*b* can be easily extracted.

Further, since the bottom mold fixing plate 75 can be removed from the bottom mold lifting plate 62 of the blow molding part 60 of the manufacturing device 100 while the bottom mold 74 remains fixed, the bottom mold 74 can be easily exchanged, and the time required for exchanging the mold can be shortened, compared to the case where the bottom mold lifting plate 62 is configured as a mold component.

Cart for Mold Exchange in Injection Molding Part 20

Figure 5:
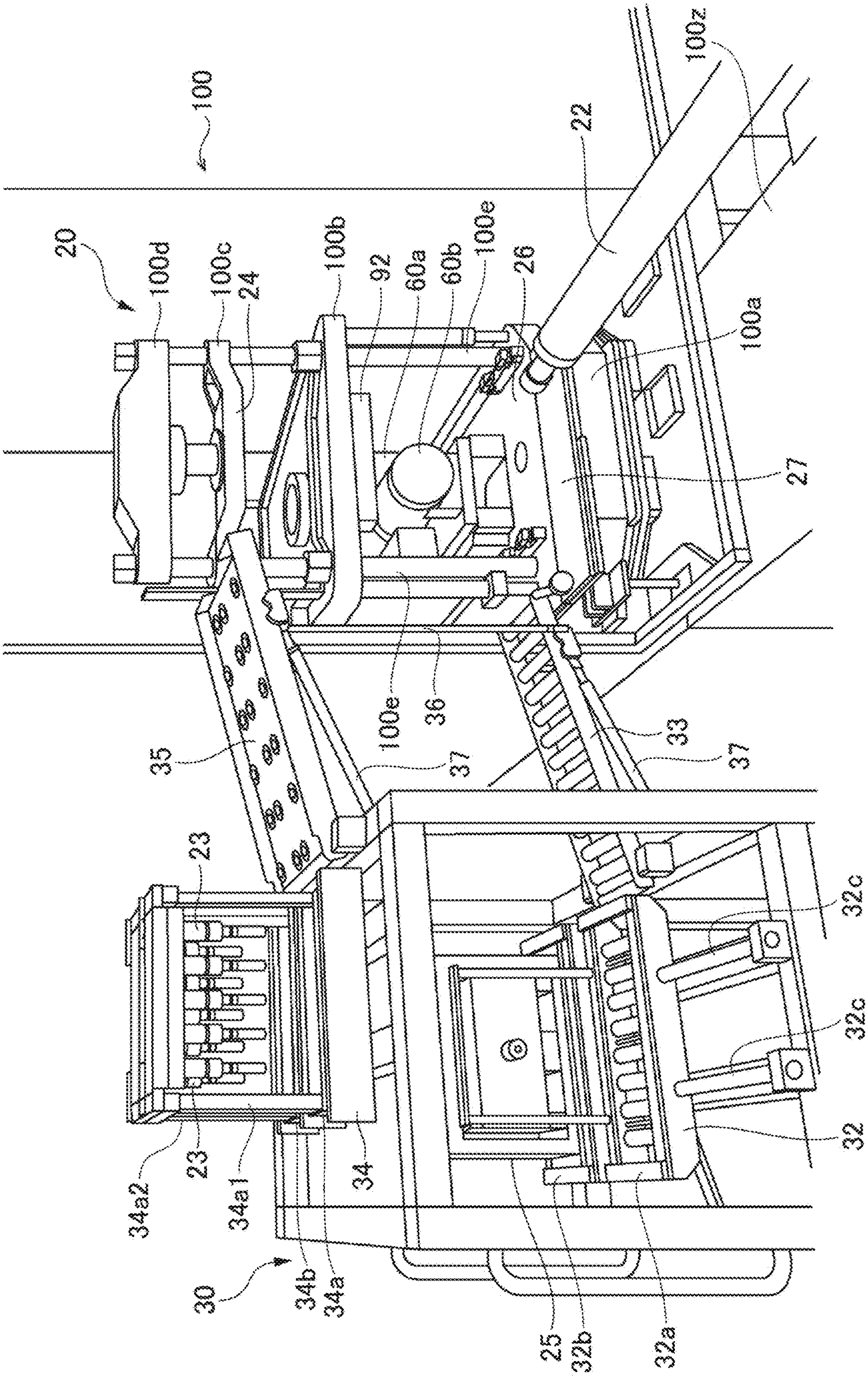
FIG. 5 is a view showing an aspect of mold exchange in an injection molding part.
Figure 6:
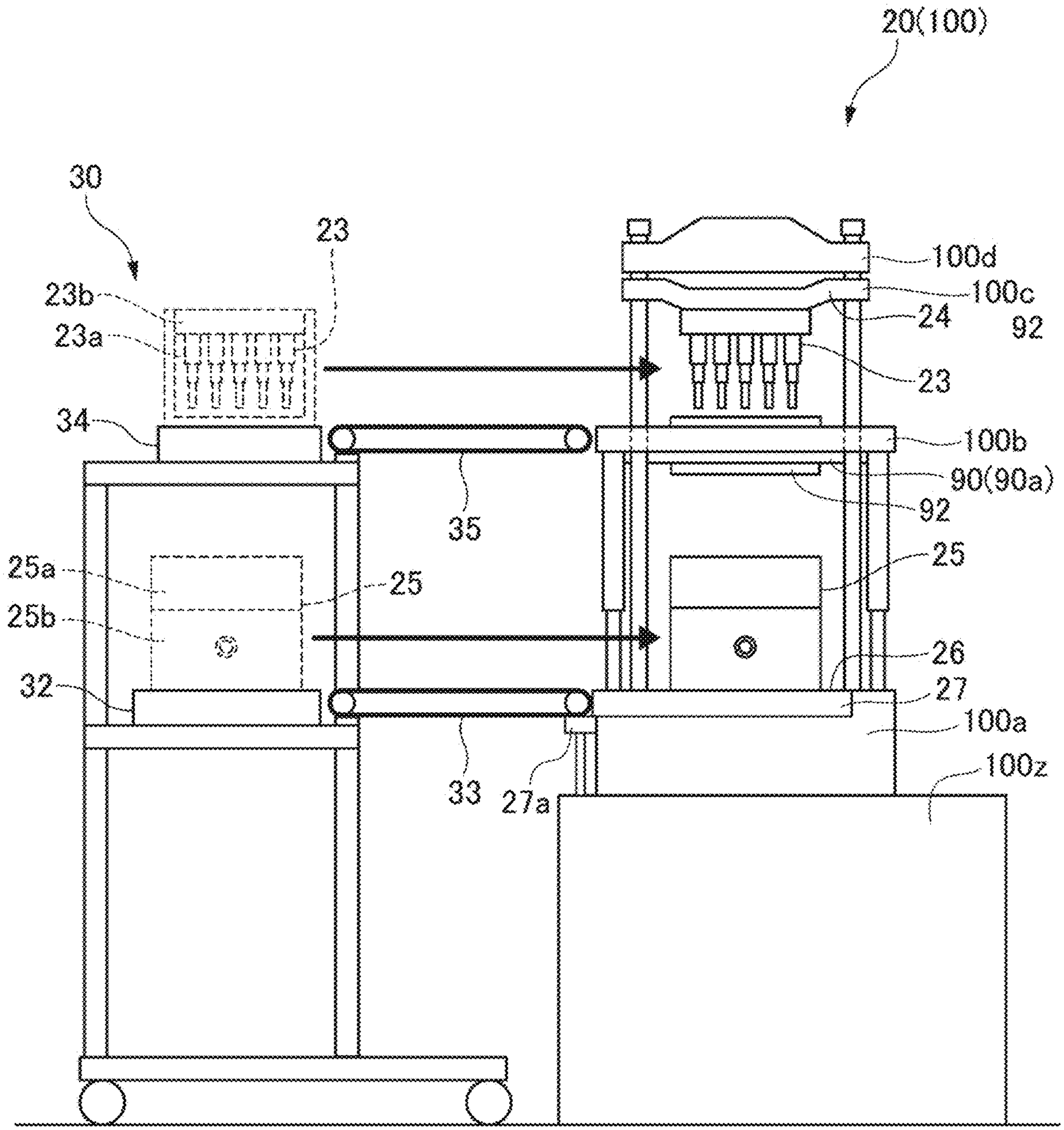
FIG. 6 is a view showing an aspect of mold exchange in the injection molding part.

Next, the injection molding part 20 and a mold exchange cart 30 (hereinafter, simply referred to as the cart 30) used in the injection molding part 20 will be described with reference to FIGS. 5 and 6. FIGS. 5 and 6 are views showing the aspect of mold exchange in the injection molding part 20.

First, the manufacturing device 100 will be further described with reference to FIGS. 5 and 6. In addition to the configurations described in FIG. 1, the manufacturing device 100 further includes a machine base 100*z* having the injection device 22 installed on an upper surface of the machine base 100*z*, the lower base 100*a* provided on the upper surface of the machine base 100*z*, an upper base 100*b* provided above the lower base 100*a* and including the conveyance means 90 (rotation plate 90*a*) on a lower surface of the upper base 100*b*, an injection core mold moving plate 100*c* provided above the upper base 100*b* and having an injection core mold unit 23 connected to a lower surface of the injection core mold moving plate 100*c*, and an injection core mold driving board 100*d* disposed above the injection core mold moving plate 100*c* and including a driving mechanism for lifting the injection core mold moving plate 100*c*. The upper base 100*b* is configured to be move up and down with respect to the lower base 100*a* by a lifting mechanism (not shown) and a guide rod (tie bar). The upper base 100*b* and the rotation plate 90*a* have through holes formed at positions corresponding to the injection molding part 20, the temperature adjustment part 40, the blow molding part 60, and the take-out part 80.

The injection molding part 20 shown in FIGS. 5 and 6 is configured to injection mold a preform by introducing a resin material from the injection device 22 into an injection molding mold including the injection core mold unit 23 and an injection cavity mold unit 25. The injection molding part 20 includes a core mold fixing part 24, provided on a lower surface of the injection core mold moving plate 100*c*, for fixing the injection core mold unit 23, and a cavity mold fixing part 26, provided on an upper surface of the lower base 100*a*, for fixing the injection cavity mold unit 25. Further, the injection molding part 20 includes a guide plate (guide mechanism) 27 that is arranged to be substantially flush with the upper surface of the lower base 100*a* and to protrude from the lower base 100*a* toward the injection device 22 side and that is provided for guiding the injection cavity mold unit 25 carried in from the cart 30 to the cavity mold fixing part 26. The injection core mold unit 23 includes at least one injection core mold 23*a*, and an injection core mold fixing member 23*b* that supports the injection core mold 23*a*. The injection cavity mold unit 25 includes at least one injection cavity mold (not shown), an injection cavity mold fixing member 25*a* that supports the injection cavity mold, and a hot runner mold 25*b*.

The cart 30 shown in FIGS. 5 and 6 includes a first shelf part 32 for mounting the injection cavity mold unit 25, and a second shelf part 34 for mounting the injection core mold unit 23. The second shelf part 34 is provided at a higher position in a vertical direction than the first shelf part 32. For example, the height of the first shelf part is set to be the same height as the upper surface of the guide plate 27 or the lower base 100*a* to which the injection cavity mold unit 25 is fixed. For example, the height of the second shelf part 34 is set to be the same height as the upper surface of the upper base 100*b* that supports the rotation plate, or to a height higher than the upper surface of the upper base 100*b*.

A first rail member 33 for carrying the injection cavity mold unit 25 into the guide plate 27 of the injection molding part 20 or carrying the injection cavity mold unit 25 out of the guide plate 27 is connected to the first shelf part 32. The first rail member 33 includes a roller conveyor. The first rail member 33 is configured to be folded (pivoted) with the portion (fixed end) connected to the first shelf part 32 as a fulcrum. A bumper member 37 is provided between a free end of the first rail member 33 and a frame portion of the cart 30, facilitating the work of moving the first rail member 33 in the horizontal direction or in the vertical direction.

Further, the first shelf part 32 is provided with a slide mechanism 32*c* in a direction intersecting a conveying direction of the injection cavity mold unit 25 on the first rail member 33 and is configured to be moved. The first shelf part 32 includes a first placement portion 32*a* and a second placement portion 32*b* to hold two injection cavity mold units 25. For example, the injection cavity mold unit 25, which was originally attached to the injection molding part 20 via the first rail member 33, is placed on the first placement portion 32*a*. Next, the first shelf part 32 (more specifically, the second placement portion 32*b*) is slid to a position facing the first rail member 33. In addition, another injection cavity mold unit 25 is carried in or out of the injection molding part 20 from the second placement portion 32*b* via the first rail member 33.

A second rail member 35 for carrying the injection core mold unit 23 in and out to the vicinity of the core mold fixing part 24 of the injection molding part 20 is connected to the second shelf part 34. The second rail member 35 is provided with spheres that partially protrude from the surface of a plate-like component. In the second rail member 35, a frictional force is reduced by the rotation of the sphere, and the injection core mold unit 23 can be easily carried into the injection molding part 20. The second rail member 35 is configured to be folded (pivoted) with the portion (fixed end) connected to the second shelf part 34 as a fulcrum. The bumper member 37 is provided between a free end of the second rail member 35 and a frame portion of the cart 30. Therefore, the work of moving the second rail member 35 in the horizontal direction or in the vertical direction is facilitated.

Further, the second shelf part 34 includes a first holing portion 34*a* and a second holing portion 34*b* configured to hold at least two injection core mold units 23. The injection core mold unit 23 is accommodated in the first holing portion 34*a* or the second holing portion 34*b* while being supported by support jigs 34*a*1, 34*a*2 from below. When carrying the injection core mold unit 23 into or out of the injection molding part 20, the second shelf part 34 is slid integrally with the support jigs 34*a*1, 34*a*2 via the second rail member 35, and is conveyed to a position of the second rail member 35 close to the core mold fixing part 24.

In a case where the mold is carried in or out, the first rail member 33 is deployed horizontally relative to the first shelf part 32 so that their upper surfaces are flush with each other, and the second rail member 35 is deployed horizontally relative to the second shelf part 34 so that their upper surfaces are flush with each other. The free end sides of the rail members are connected by a rod member 36, so that in a case where one of the rail members is deployed, the other of the rail members is also extended. Further, a connecting portion (support mechanism) 27*a* that supports (fixes) the first rail member 33 in an immovable state is provided on at least the lower base 100*a* of the manufacturing device 100 (or the machine base 100*z* in the vicinity of the guide plate 27). In addition, a connecting portion for fixing the second rail member 35 to the upper base 100*b* may be provided.

Next, a method for exchanging the mold of the injection molding part 20 using the cart 30 will be described. The injection core mold unit 23 is mounted on the second shelf part 34 of the cart 30, and the injection cavity mold unit 25 is mounted on the first shelf part 32 of the cart 30. Subsequently, the cart 30 is moved to the side of the injection molding part 20 of the manufacturing device 100, and the first rail member 33 and the second rail member 35 are tilted down from the accommodation position in the vertical direction and deployed to the conveyance position in the horizontal direction, thereby providing a carry-in path to the injection molding part 20. After the horizontal deployment, the free end of the first rail member 33 is disposed immediately beside the guide plate 27, and the free end of the second rail member 35 is disposed on the side of the injection core mold moving plate 100*c*. Subsequently, at least the free end of the first rail member 33 is fixed to the connecting portion 27*a* of the manufacturing device 100 so that the cart 30 does not move during the mold exchange work. Meanwhile, in order to avoid interference between the injection device 22 and the mold when exchanging the mold, the injection device 22 is retracted from the position where it overlaps the guide plate 27.

At this time, in a case where there are other injection core molds and injection cavity molds in injection molding part 20, these molds are removed respectively from the core mold fixing part 24 and the cavity mold fixing part 26 and moved and to the cart 30 (specifically, the vacant placement portion 32*a* (32*b*) of the first shelf part 32 and the vacant holding portion 34*a* (34*b*) or the support jig 34*a*1 (134*a*2)) via the first rail member 33 and the second rail member 35.

Subsequently, the injection core mold unit 23 and the injection cavity mold unit 25 are carried into the injection molding part 20. The injection cavity mold unit 25 is first pushed and moved to the guide plate 27, and then, pushed and moved onto the cavity mold fixing part 26 Next, the injection cavity mold unit 25 placed on the cavity mold fixing part 26 is fixed to the lower base 100*a* with a cavity mold connecting member (a positioning pin and a clamp member (or a positioning pin and a bolt)). Regarding the injection core mold unit 23, after two rail-like jigs (for example, guide rails 98 illustrated in FIG. 8) are connected to the lower surface of the injection core mold moving plate 100*c*, the injection core mold unit 23 is placed on the rail-like jigs and pushed to the position of the core mold fixing part 24. Next, the injection core mold unit 23 placed on the core mold fixing part 24 is fixed with a core mold connecting member (a bolt or the like). Next, the two rail-like jigs are removed from the injection core mold moving plate 100*c*. In this way, the exchange of the mold in the injection molding part 20 is completed.

Effect

According to the method of exchanging the mold in the injection molding part 20 using the cart 30, the injection core mold unit 23 and the injection cavity mold unit 25 can be conveyed simultaneously, improving the work efficiency of a worker and reducing the time required for mold exchange. In particular, the work efficiency can be greatly improved, as compared to the case where the injection core mold unit 23 is lifted by a crane near the manufacturing device 100.

Further, the above-mentioned mold exchange method using the cart 30 may also be used in the blow molding part 60. In this case, the blow molding mold unit 70 (the blow cavity mold and the bottom mold) is mounted on the first shelf part 32, and unitized blow core (blow nozzle) mold and the stretch rod are mounted on the second shelf part 34.

Further, the guide plate 27 is disposed in front of the lower base 100*a* of the injection molding part 20 (to protrude from the lower base 100*a* toward the injection device 22). In this way, when the injection cavity mold unit 25 is carried in or out, interference with guide rods (tie bars) 100*e* located on both sides of the cavity mold fixing part 26 is suppressed, improving the workability of mold exchange.

Ejector Mechanism of Take-Out Part 80

Figure 7A:
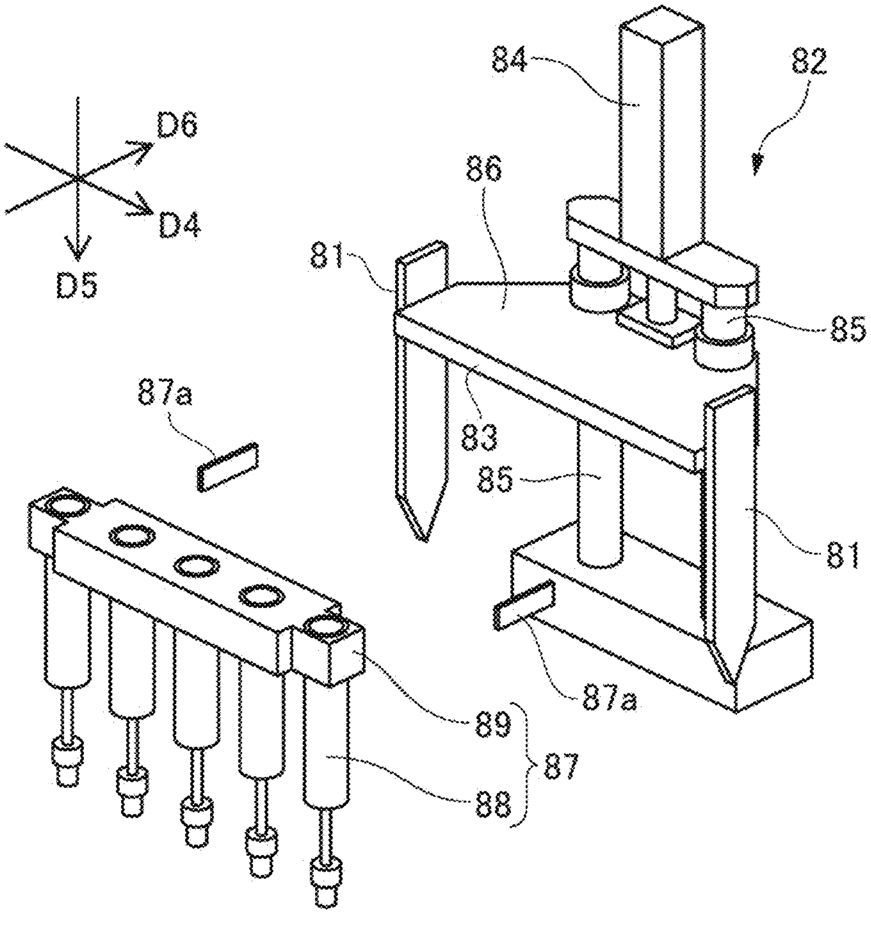
FIG. 7A is an exploded perspective view of an ejector mechanism.
Figure 7B:
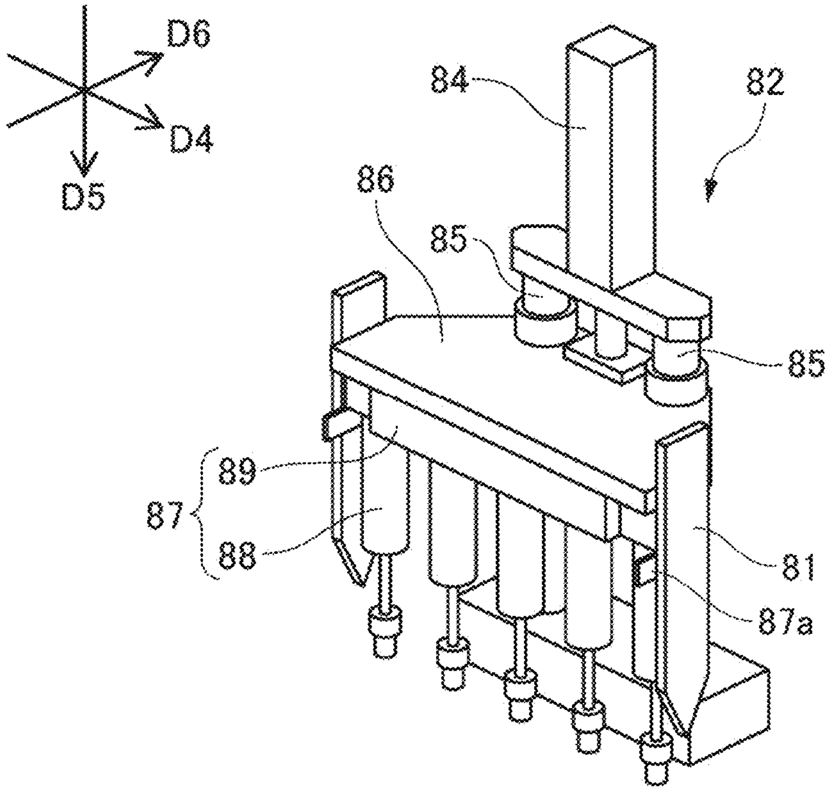
FIG. 7B is a perspective view of the ejector mechanism.

Next, an ejector mechanism 82 used in the take-out part 80 will be described with reference to FIGS. 7A and 7B. FIG. 7A is an exploded perspective view of the ejector mechanism 82. FIG. 7B is a perspective view of the ejector mechanism 82.

The ejector mechanism 82 is provided on the upper surface of the upper base 100*b* at a position corresponding to the take-out part 80. The ejector mechanism 82 includes at least an air cylinder (ejector rod driving mechanism) 84, a guide rod 85, a lifting plate (ejector rod moving plate) 86, and an ejector mold unit 87. Further, the ejector mechanism 82 has a pair of ejector plates 81 each having a wedge-shaped tip on both side surfaces of the lifting plate 86. The air cylinder 84 and the guide rod 85 are connected to the lifting plate 86. The guide rod 85 guides the lifting and lowering operation of the lifting plate 86 by the air cylinder 84. The ejector mold unit 87 is a component in which an ejector rod 88 is fixed to an ejector rod fixing plate 89.

The ejector rod fixing plate 89 of the ejector mold unit 87 is connected to the lifting plate 86, so that the ejector mold unit 87 can be lifted and lowered. The ejector mold unit 87 is configured to be connected to the lifting plate 86 with the ejector rod 88 fixed to the ejector rod fixing plate 89. As the lifting plate 86 descends, the ejector plate 81 enters a wedge-shaped hole (not shown) in an upper surface of a lip plate 92 (to be described later) and opens the lip plate 92. As the lifting plate 86 descends, the ejector rod 88 is inserted into a neck portion of a container before the lip plate 92 is opened, and guides the container so that the container falls with a normal posture when the lip plate 92 is opened.

Here, a direction in which a plurality of ejector rods 88 are arranged or a direction in which the ejector plates 81 are arranged is defined as a fourth direction D4, a direction in which the lifting plate 86 is lifted and lowered is defined as a fifth direction D5, and a direction orthogonal to the fourth direction D4 and the fifth direction D5 is defined as a sixth direction D6. The air cylinder 84 and the guide rod 85 are connected to a portion of the lifting plate 86 on one side in the sixth direction D6 while being shifted from the center portion of the lifting plate 86. The air cylinder 84 and the guide rod 85 are not provided on the portion of the lifting plate 86 on the other side in the sixth direction D6.

That is, in the ejector mechanism 82, one side in the sixth direction D6 with respect to the ejector mold unit 87 is closed by the guide rod 85, and the other side in the sixth direction D6 with respect to the ejector mold unit 87 is not closed by the guide rod 85 but is opened. Since there is a portion that is not closed by the guide rod 85 but is opened, the exchange of the ejector mold unit 87 becomes easier, and the time required for exchanging the component can be reduced. Meanwhile, such a configuration is not limited to the ejector mechanism 82, and can also be applied to, for example, temperature adjustment core components, and the like. Such a configuration can be applied to components that are attached to a lifting plate to be lifted and lowered, and that are not subjected to a relatively strong mold-clamping pressure.

The ejector mold unit 87 is placed on two rail-like members 87*a* provided on sides of the ejector plates 81 and then is pushed to the position of an ejector rod mold fixing portion 83 on the lower surface of the lifting plate 86. Next, an ejector rod connecting member (a fixing pin, a bolt, or the like) is inserted into an upper hole of the lifting plate 86, and the ejector mold unit 87 is fixed to the lifting plate 86. The two rail-like members 87*a* may or may not be removed from the ejector plate 81.

Lip Plate of Conveyance Means 90

Figure 8:
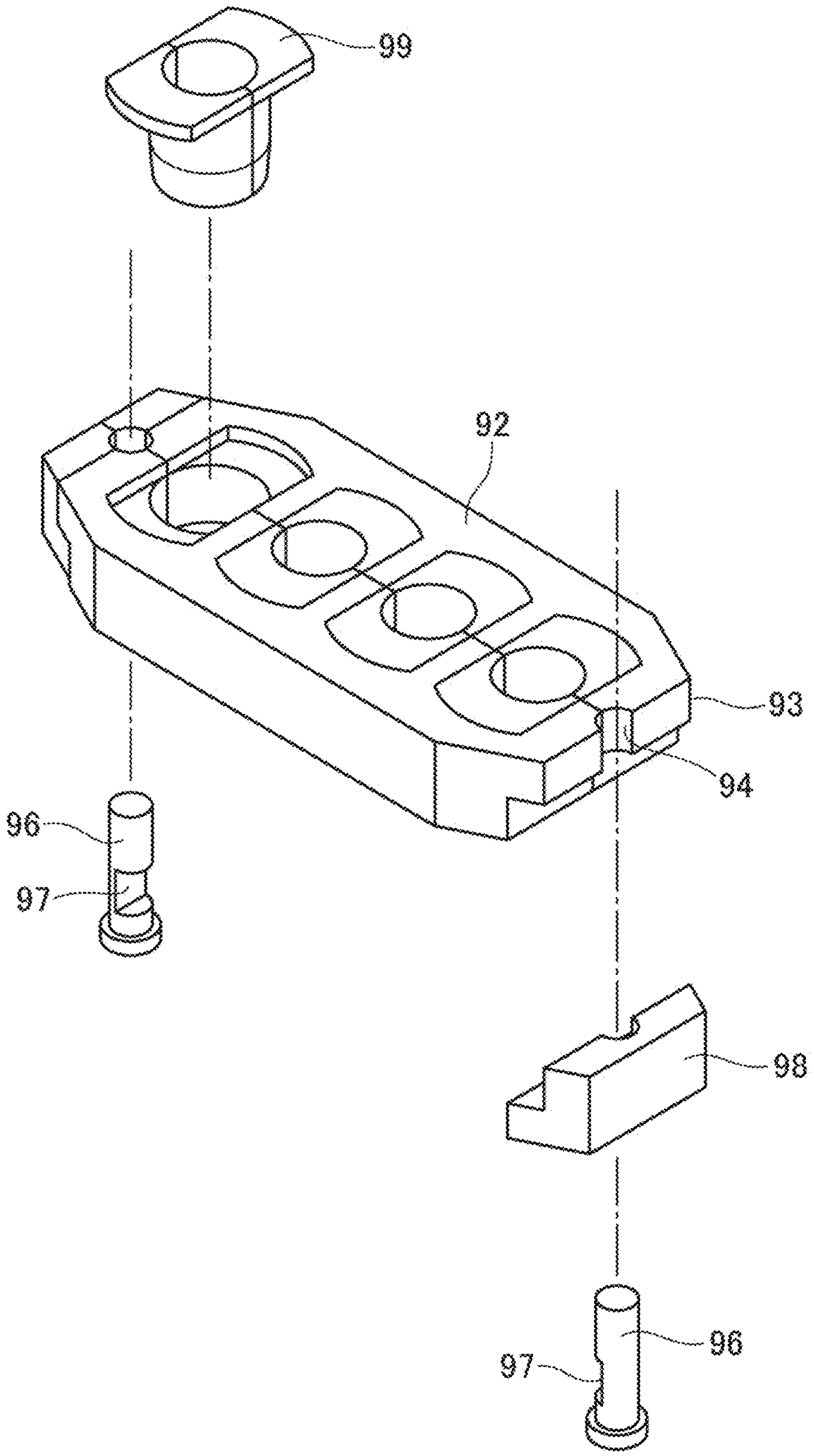
FIG. 8 is an exploded perspective view of a lip plate.
Figure 9A:
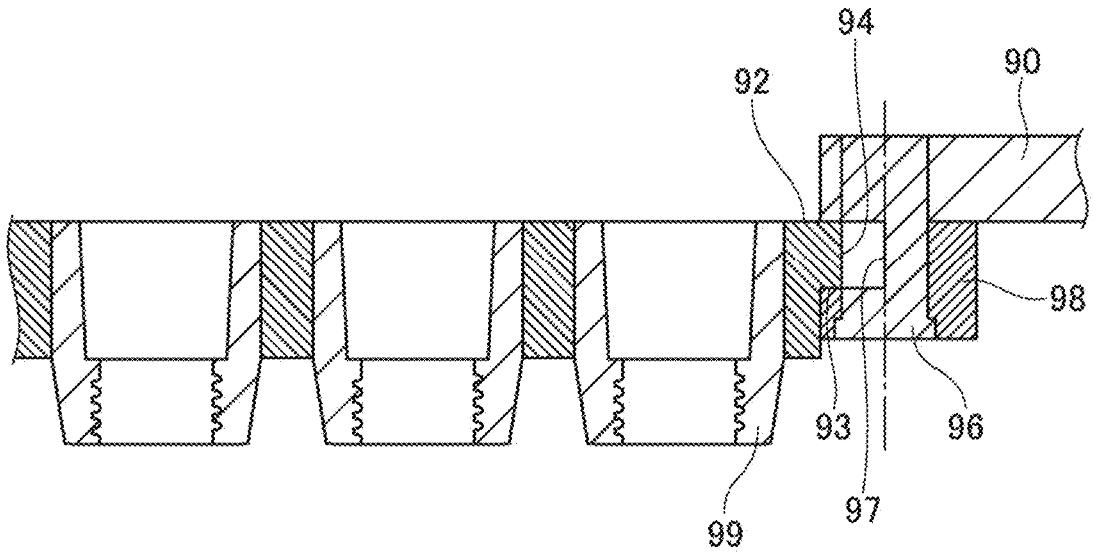
FIG. 9A is a cross-sectional view showing a state in which the lip plate is attached to a conveyance means.
Figure 9B:
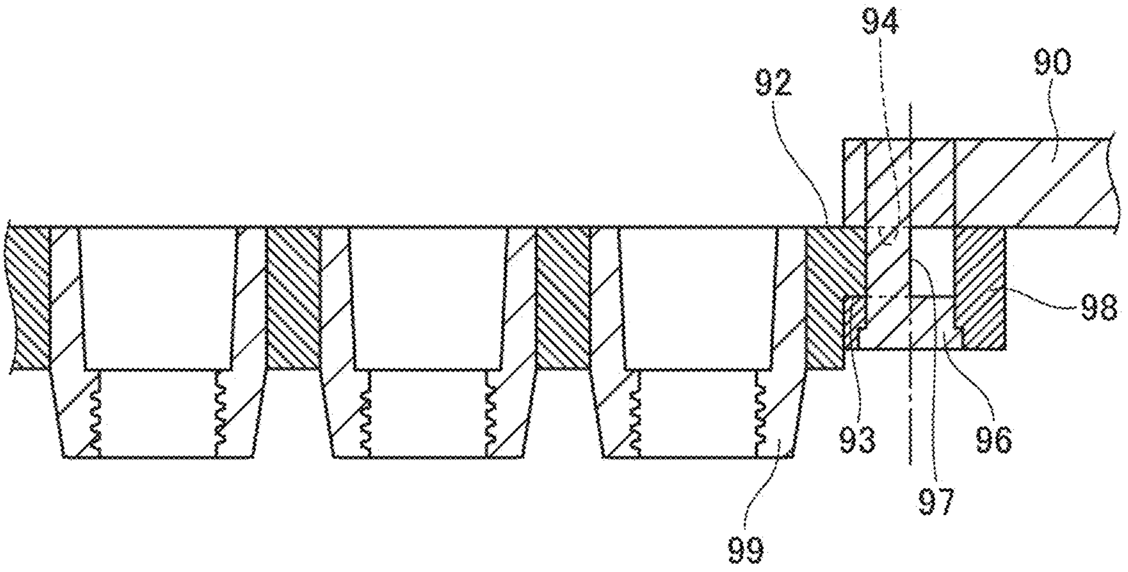
FIG. 9B is a cross-sectional view showing a state in which the lip plate is attached to the conveyance means.

Next, the lip plate 92 of the conveyance means 90 will be described with reference to FIGS. 8, 9A and 9B. FIG. 8 is an exploded perspective view of the lip plate 92. Here, FIG. 8 is an exploded perspective view for facilitating the understanding of components related to the attachment of the lip plate of the conveyance means 90 and is not intended to show the procedure of attachment. FIGS. 9A and 9B are cross-sectional views showing a state in which the lip plate 92 is attached to the conveyance means 90.

The lip plate 92 is configured to hold a lip mold 99 and to be able to open and close the lip mold 99. The lip plate 92 is made up of a pair of split plates, which are integrated by a biasing component and are configured not to separate from each other when a preform or a container is conveyed. The lip mold 99 is made up of a pair of lip split molds, each of which is fixed to the pair of split plates of the lip plate 92 so that parting surfaces of the lip split molds abut against each other. The guide rail 98 is attached to the conveyance means 90 provided in the manufacturing device 100, and a positioning pin 96 is inserted into the guide rail 98 and the conveyance means 90 from the guide rail 98 side. The positioning pin 96 is provided with a cut-out portion 97. The lip plate 92 is provided with a flange portion 93 for inserting into the guide rail 98 and attaching to the conveyance means 90. A relief portion 94 capable of accommodating the positioning pin 96 is provided in a center portion of the flange portion 93 of the lip plate 92.

Subsequently, a method of attaching the lip plate 92 to the guide rail 98 attached to the conveyance means 90 will be described. First, the positioning pin 96 is rotated so that the cut-out portion 97 of the positioning pin 96 inserted into the guide rail 98 faces inward. Subsequently, the flange portion 93 of the lip plate 92 is inserted into the guide rail 98 so as to pass through the cut-out portion 97 of the positioning pin 96 (FIG. 9A). Once the lip plate 92 is positioned at the center of the guide rail 98, the positioning pin 96 is rotated so that the cut-out portion 97 faces outward, and the positioning pin 96 is accommodated in the relief portion 94 of the lip plate 92 (FIG. 9B). In this way, the attachment of the lip plate 92 to the conveyance means 90 is completed.

By providing the guide rail 98 and the positioning pin 96 in advance on the conveyance means 90 of the manufacturing device 100, the lip plate 92 can be easily attached, and the time required for exchanging the components can be reduced. Meanwhile, the positioning pin 96 may be configured to be inserted through a hole formed in the lower side or side surface of the guide rail 98 and to be attached to and detached from the conveyance means 90 or the guide rail 98.

Meanwhile, the present disclosure is not limited to the above-described embodiment, and can be modified and improved as appropriate. In addition, the material, shape, size, value, form, number, location, and the like of each component in the above-described embodiment are arbitrary and not limited as long as the present disclosure can be achieved.

In the above-described embodiment, individual aspects of the blow molding part 60, the injection molding part 20, the take-out part 80, and the conveyance means 90 have been described. However, these parts may be applied independently to the manufacturing device. For example, the aspect of the blow molding part 60 in the above-described embodiment may be applied to a resin container manufacturing device including a blow molding part that blow molds a resin container from a bottomed resin preform. However, by combining the above-described configurations, the time required for component exchange can be further reduced. A manufacturing device that combines each of the configurations is preferable because it improves the overall efficiency of exchanging molds or other components. Further, in the blow molding part 60, a blow core mold unit having one or more blow cores and a stretch rod unit having one or more stretch rods may be configured to be integrally connected to a lifting device provided at a position above an upper base of the blow molding part 60.

Further, the above-described embodiment is preferable when applied to a manufacturing device for high-mix, small-lot production. The manufacturing device for high-mix, small-lot production is relatively small. The above-described embodiment can be used, for example, in a manufacturing device in which the injection capacity of the injection device in one molding cycle is 250 $cm^3$ or less. Since the mold components are small in such a small-scale device, configurations that cannot be applied to a large-scale device due to weight considerations, for example, can be applied to the small-scale device to improve the efficiency of exchanging molds or other components.

Further, in the above-described embodiment, the aspects of various components, devices, and component exchange based on an example of a manufacturing device for molding a plurality of containers in one molding cycle have been described. However, the aspects of various components, devices, and component exchange described above may be applied to a manufacturing device for molding one container in one molding cycle.

The present application incorporates the contents disclosed in Japanese Patent Application (Patent Application No. 2022-050787) filed on Mar. 25, 2022, as appropriate.

REFERENCE SIGNS LIST

20: Injection Molding Part, 22: Injection Device, 23: Injection Core Mold Unit, 24: Core Mold Fixing Part, 25: Injection Cavity Mold Unit, 26: Cavity Mold Fixing Part, 27: Guide Plate, 30: Mold Exchange Cart, 32: First Shelf Part, 33: First Rail Member, 34: Second Shelf Part, 35: Second Rail Member, 40: Temperature Adjustment Part, 60: Blow Molding Part, 62: Bottom Mold Lifting Plate, 63: Recessed Portion, 64: Lifting Rod, 70: Blow Molding Mold Unit, 72: Blow Cavity Split Molds, 73: Split Mold Fixing Plate, 74: Bottom Mold, 75: Bottom Mold Fixing Plate, 76: Jig, **76*a*: Fastening Portion, 76*b*: Bottom Mold Support Portion, 76*c*: Arm Portion, 78: Spacer Component, 80: Take-out Part, 82: Ejector Mechanism, 84: Air Cylinder, 85: Guide Rod, 86: Lifting Plate, 87: Ejector Mold Unit, 88: Ejector Rod, 89: Ejector Rod Fixing Plate, 90: Conveyance Means, 92: Lip Plate, 93: Flange Portion, 94: Relief Portion, 96: Positioning Pin, 97: Cut-out Portion, 98: Guide Rail, 99: Lip Mold, 100**: Manufacturing Device

The invention claimed is:

1. A blow molding mold unit comprising:
- a pair of blow cavity split molds for forming a blow cavity, the blow cavity defining a shape of a side surface of a resin container in a state where the molds are closed;
- a bottom mold defining a shape of a bottom surface of the resin container; and
- a jig configured to integrally support the pair of blow cavity split molds and the bottom mold,
- wherein, in a case where a direction extending from a shoulder portion or a body portion to a bottom portion of the resin container defined by the blow cavity is defined as a first direction, a direction in which the pair of blow cavity split molds are opened is defined as a second direction, and a direction orthogonal to the first direction and the second direction is defined as a third direction, the jig is provided at an end of the blow molding mold unit in the third direction,
- wherein the jig includes:
  - a fastening portion fastened to the pair of blow cavity split molds;
  - a bottom mold support portion configured to support the bottom mold from a side of the bottom portion in the first direction; and
  - an arm portion provided between the fastening portion and the bottom mold support portion, wherein the bottom mold support portion extends from the arm portion toward the inside of the blow molding mold unit, wherein the blow molding mold unit further comprises a bottom mold fixing plate to which the bottom mold is fixed, wherein the bottom mold support portion is configured to support the bottom mold and the bottom mold fixing plate from the side of the bottom portion in the first direction, wherein the bottom mold fixing plate is configured to be connected to a bottom mold lifting plate provided in a device for manufacturing the resin container, wherein the bottom mold lifting plate includes a recessed portion at an end of the bottom mold lifting plate in the third direction, and wherein the bottom mold support portion is accommodated in the recessed portion of the bottom mold lifting plate in a case where the bottom mold and the bottom mold fixing plate are placed on the bottom mold lifting plate.

2. A resin container manufacturing device comprising a blow molding part for blow molding a resin container from a bottomed resin preform, the blow molding part comprising:

a pair of blow cavity split molds for forming a blow cavity, the blow cavity defining a shape of a side surface of the resin container in a state where the molds are closed;

a bottom mold defining a shape of a bottom surface of the resin container;

a jig configured to integrally support the pair of blow cavity split molds and the bottom mold;

a bottom mold fixing plate to which the bottom mold is fixed;

a bottom mold lifting plate connected to the bottom mold fixing plate; and a lifting rod fixed to the bottom mold lifting plate, wherein the bottom mold fixing plate is configured to be attached to or detached from the bottom mold lifting plate in a state where the bottom mold is fixed to the bottom mold fixing plate, wherein, in a case where a direction extending from a shoulder portion or a body portion to a bottom portion of the resin container defined by the blow cavity is defined as a first direction, a direction in which the pair of blow cavity split molds are opened is defined as a second direction, and a direction orthogonal to the first direction and the second direction is defined as a third direction, the jig is provided at an end of the blow molding mold unit in the third direction, wherein the jig includes:

a fastening portion fastened to the pair of blow cavity split molds;

a bottom mold support portion configured to support the bottom mold from a side of the bottom portion in the first direction; and an arm portion provided between the fastening portion and the bottom mold support portion, wherein the bottom mold support portion extends from the arm portion toward the inside of the blow molding mold unit, wherein the bottom mold support portion is configured to support the bottom mold and the bottom mold fixing plate from the side of the bottom portion in the first direction, wherein the bottom mold lifting plate includes a recessed portion at an end of the bottom mold lifting plate in the third direction, and wherein the bottom mold support portion is accommodated in the recessed portion of the bottom mold lifting plate in a case where the bottom mold and the bottom mold fixing plate are placed on the bottom mold lifting plate.

* * * * *